United States Patent [19]

MacMillan et al.

[11] 3,869,744

[45] Mar. 11, 1975

[54] DEVICE WITH ATTACHED GRAB LINE

[75] Inventors: Donald Stuart MacMillan; Leonard Churchward, both of Burlington, Ontario, Canada

[73] Assignee: Polyurcon Limited, Burlington, Ontario, Canada

[22] Filed: Sept. 24, 1973

[21] Appl. No.: 400,466

[52] U.S. Cl. .................................................. 9/340
[51] Int. Cl. ............................................ B63c 9/08
[58] Field of Search ........................ 9/311, 337, 340

[56] References Cited
UNITED STATES PATENTS
3,032,789   5/1962   Fedorowicz ............................ 9/340
FOREIGN PATENTS OR APPLICATIONS
455,135   10/1936   Great Britain ........................ 9/340

Primary Examiner—Trygve M. Blix
Assistant Examiner—Stuart M. Goldstein
Attorney, Agent, or Firm—Stanley J. Rogers

[57] ABSTRACT

In a device with an attached grab line, such as a safety floatation device, the line is removably secured by passing it through the body of the device into a recess therein having at least one ridged side wall, the ridges pressing the line against the opposite wall, which may also be ridged, with high enough friction to prevent longitudinal movement of line. The device typically comprises a ring with the line extending as a series of equal loops around the outer circumference. In a moulded device comprising a pre-formed skin filled with expanded polymer the line passes through pre-formed passages; a portion of the wall of each passage is of reduced thickness, so that as the polymer expands in the skin it causes the line to be gripped by that wall portion.

8 Claims, 3 Drawing Figures

PATENTED MAR 11 1975　　　3,869,744

DEVICE WITH ATTACHED GRAB LINE

FIELD OF THE INVENTION

This invention is concerned with improvements in or relating to devices provided with an attached grab line, and especially but not exclusively to buoyant safety devices having a grab line removably attached thereto in the form of a series of loops.

DESCRIPTION OF THE PRIOR ART

Flotation devices such as life rings usually are provided on boats, beside swimming pools, etc., and in most instances must be provided by law and must pass stringent official tests. A usual form of such a device is a ring of a size to pass easily over a person's head, and provided around its outer periphery with a grab or safety line, which is fastened at spaced intervals to the outer periphery so as to provide a series of loops that can easily be grabbed by the person to whom the ring has been thrown. Similarly, the large size box-like flotation devices that are provided aboard large boats must be provided with one or more grab lines around its periphery, also in the form of a series of loops.

It has been a continuing problem with such devices to attach the line thereto in a secure and inexpensive manner. The manner in which the line is secured to the device, and the maximum force that can be applied without breakage or longitudinal movement of the line, is usually one of the above-mentioned tests to be met for official approval. The problem most commonly encountered is that the grab line and/or its fastening to the device is usually the part of the device most susceptible to deterioration or damage, with the result that it must often be replaced. It has been difficult hitherto to provide a simple, inexpensive method of securely fastening a grab line that will easily pass the above-mentioned stringent tests, and yet will permit the line to be replaced or repaired as and when necessary without requiring a large amount of labour. The field of manufacture and sale of such devices is also extremely competitive in scope, and any procedure of mounting and fastening the grab line that is relatively high in labour content may increase the price of the finished article to an uneconomic extent.

One prior example of the way in which this problem has been solved is shown in U.S. Pat. No. 3,032,789, issued May 8, 1962 to B. F. Goodrich Company, wherein the grab line passes through the body of the ring at a number of equally spaced points around its periphery, so that a corresponding number of loops of the line extend into respective recesses formed in the inner periphery of the ring. Each loop passes around an insert which is forced into the recess and grips the line between itself and the walls of the recess to prevent longitudinal movement of the line.

DEFINITION OF THE INVENTION

It is the principal object of the present invention to provide a device, such as a flotation safety device, with a new method of attaching a grab or safety line thereto.

It is a more specific object to provide a device, such as a safety flotation device, with a new method of attaching a grab or safety line thereto which does not require use of any separate pieces, such as inserts, etc.

In accordance with the present invention there is provided a device with an attached grab line comprising a body having formed therein at least one recess opening to a surface of the body with side walls and a bottom wall provided by the body, and at least two passages opening into the recess for the garb line to pass through one of said passages into the recess and through the other passage out of the recess, two opposite recess side walls frictionally engaging the line passing between them and at least one of the side walls being ridged transversely to the direction of extension of the line thereover to increase the frictional engagement between it and said side walls for prevention of longitudinal movement of the line in the body.

Preferably the body of the device is formed by a moulding operation and has a plurality of said recesses formed therein by the moulding operation; when the device takes the form of a ring the recesses preferably are formed opening to the radially innermost periphery of the ring, while each passage in the body extends radially from the bottom wall of the respective recess to the radially outermost periphery of the ring.

The other side wall of the said two opposite walls of the recess may also be ridged, with the ridges thereof extending between the ridges of the first mentioned side wall, so that the line must follow a convoluted path within the recess. In a moulded device comprising a pre-formed skin filled with an expanded polymer a portion of the pre-formed wall of each passage may be of reduced thickness, so that the pressure of the polymer within the skin causes the line to be gripped by the wall portion.

DESCRIPTION OF THE DRAWINGS

A particular preferred embodiment of the invention will now be described, by way of example, with reference to the accompanying diagrammatic drawing, wherein.

DESCRIPTION OF THE PREFERRED EMBODIMENTS

Figure 1:
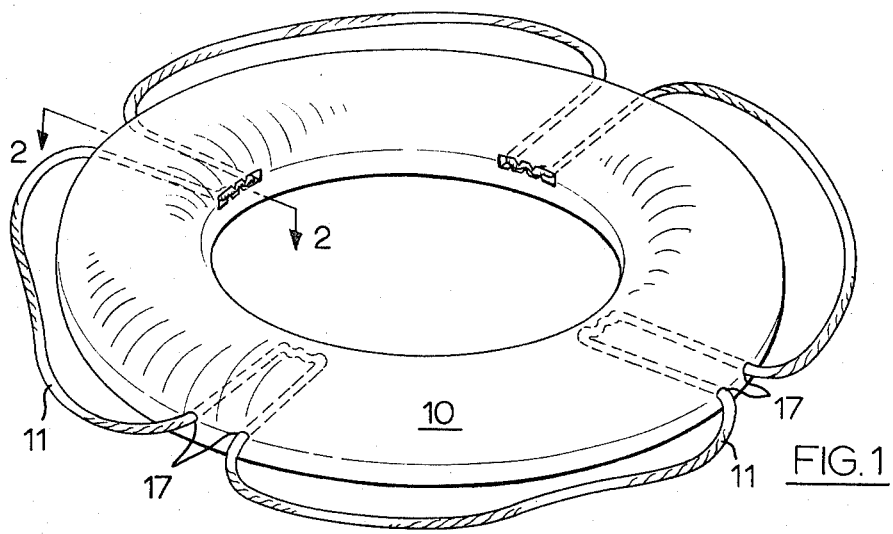
FIG. 1 is a general perspective view of a ring-shaped flotation safety device in accordance with the invention, the parts of the grab line that are within the body being shown in broken lines to illustrate how a continuous loop of line is mounted in the body.

The embodiment particularly described and illustrated is a flotation safety device comprising a ring-shaped body 10 provided with a grab line 11, constituted by an endless loop of a suitable rope threaded through the body and secured thereto in a manner to be described in detail below.

In this particular embodiment the body is made by preforming a thin skin 12 of a suitable plastic material, which thereafter is filled under pressure with an expanded polymeric material 12a. Alternatively, the device may of course be moulded in a single operation from a single material. In this embodiment the device is provided at its radially innermost periphery with four equally-spaced recesses 13, which are formed in the skin as it is moulded by means of suitably-shaped removable inserts in the mould.

A suitable method of forming such a skin is, for example, the so-called "slush moulding" technique, wherein a heated mould filled with a fluid material is rotated at random to cause the fluid material to adhere as a uniform layer to the walls of the mould and to harden and/or cure thereon, until it forms a self-supporting skin which can be stripped from the mould. The inserts about which the parts of the skin forming the recesses are moulded can easily be removed after formation of the skin by withdrawing them towards the centre of the ring.

Each recess opens towards the centre of the ring and is of generally rectangular cross-section transverse to its open face. Each is bounded by a bottom wall 14, two shorter side walls 15 and two longer side walls 16. Two passages 17 extend radially from the bottom wall 14 of the recess to the radially outermost periphery of the ring for the passage of the grab line from the exterior of the ring through the body to the recess and then out again to the outermost periphery.

In this embodiment each of the longer side walls 16 is provided with a respective set of straight parallel ridges 16a extending generally radially with respect to the ring axis, and with the ridges of one set extending into the spaces between the ridges of the other set. In passing through each recess from one passage to the other the grab line must follow a highly convoluted path and is forced by each ridge 16a into high frictional contact with the adjacent ridges, so that there is high frictional resistance to longitudinal movement of the line through the recess. The ridges are shown herein as of triangular cross-section but can be of any other suitable cross-section. In other embodiments only one set of ridges 16a may be provided which extend toward the opposite wall and engage the line with the necessary high frictional contact.

Figure 2:
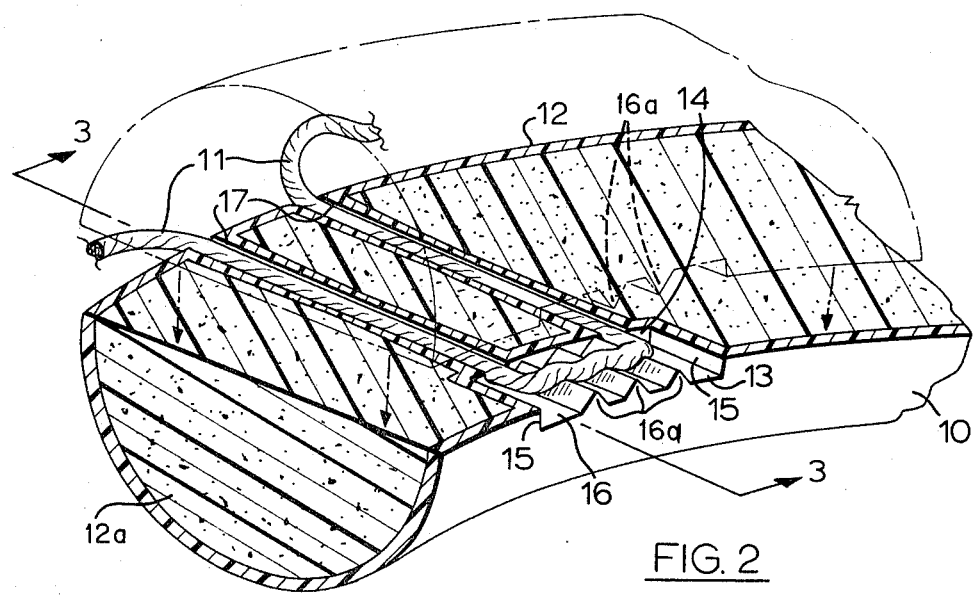
FIG. 2 is a section taken on the line 2—2 of FIG. 1, with the upper part of the ring shown in phantom to show the interior construction.
Figure 3:
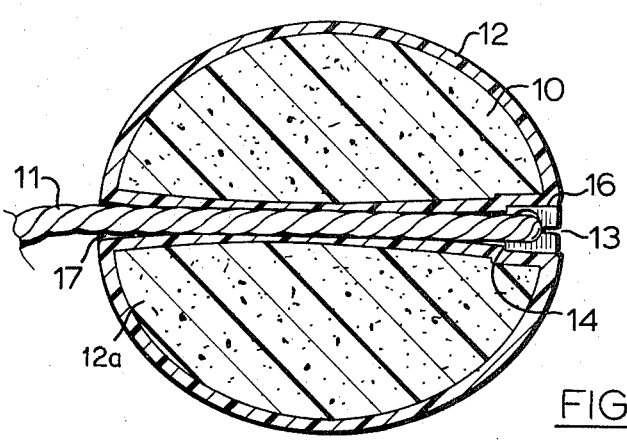
FIG. 3 is a section taken on the line 3—3 of FIG. 2.

In the manufacture of this particular embodiment the skin is first formed, for example as described above, and is then placed in a mould where it is filled under pressure with an expanded polymer, such as a closed cell polyurethane. One end of a length of the rope forming the grab line is threaded through one passage 17 and straight out through the open side of the recess; this rope end is then returned and is threaded through the other passage 17 to the outer side of the ring. The line is then pulled radially outward, whereupon the loop that has been formed at the inner side of the ring is pulled into the recess, moving relatively easily in the radial direction, even though it is in contact with the ridges, and being forced thereby into the convoluted shape most readily seen in FIG. 2 of the drawing. However once the loop has been pulled into the recess into engagement with the ridges, and especially when it has been pulled to its maximum possible extent, then it is found that the force required to move it longitudinally is sufficiently great to fully meet the known official requirements for such devices. Preferably it is arranged that the two ends of the rope meet in a recess, where they can be joined together by fusing or by some form of sleeve, with thereafter is pulled into the recess so that the line shows a completely unbroken periphery all around.

If at any time the rope becomes worn or is broken and must be replaced then it can be pulled relatively easily radially out of the recesses, by use of a simple hooked tool, and thereafter removed and replaced.

In the case of a device formed from expanded polymer additional resistance to longitudinal movement of the line can be provided by making the parts of the skin forming the passages 17 with portions of reduced thickness along their length. The line is then inserted into the skin before the pressurized internal filling is injected. The pressure of the expanded material within the skin interior then presses the reduced thickness wall portions much harder against the line to grip it and retain it in the passage against the longitudinal movement. The polymers of the skin and the filling will usually remain sufficiently flexible for the line to be removed and replaced without exceptional difficulty.

Although the invention has been described as applied to a ring-shaped device, its application to other shapes, and particularly to other forms and shapes of safety flotation device will be apparent to those skilled in the art.

We claim:

1. A device with an attached grab line comprising: a body having formed therein at least one line-retaining recess opening to a surface of the body;

the recess having side walls and a bottom wall provided by the body;

at least two passages passing through the body and opening into the recess;

the grab line passing through one of the passages from outside the body to the interior of the recess and through the other passage from the interior of the recess to the exterior of the body;

the line frictionally engaging two opposite side recess walls between which it extends from one passage to the other;

at least one of the said opposite side walls frictionally engaged by the line being ridged transversely of the direction in which the line extends in engagement therewith to increase the friction between the line and the engaged sidewalls and thereby prevent longitudinal movement of the part of the line in the recess.

2. A device as claimed in claim 1, wherein the other of the said two opposite recess side walls is also ridged transversely of the direction in which the line extends with the ridges thereof extending between the ridges of the first-mentioned ridged side wall.

3. A device as claimed in claim 1, wherein the recess is of substantially rectangular cross-section parallel to the bottom wall to have two opposite longer side walls and two opposite shorter side walls, each of the longer side walls is provided with a respective set of straight spaced ridges extending parallel to one another and to the shorter side walls, the two sets being displaced relative to one another for the ridges of one set to extend between the ridges of the other set.

4. A device as claimed in claim 1, wherein the body comprises a moulded material formed by a moulding operation and having the said recess formed therein by the moulding operation.

5. A device as claimed in claim 1, wherein the body comprises a ring of moulded material formed by a moulding operation and having a plurality of the said recesses formed therein by the moulding operation.

6. A device as claimed in claim 5, wherein the said recesses are formed opening to the radially inner circumference of the ring, and each of the said passages through which the grab line passes through the body extends from its respective recess bottom wall to the radially outer circumference of the ring.

7. A device as claimed in claim 5, wherein the said recesses are formed opening to the radially inner circumference of the ring, the said two opposite recess side walls are both ridged for frictional engagement with the grab line and are the two side walls parallel to the ring median plane.

8. A device as claimed in claim 1, wherein the body comprises a pre-moulded skin having the said recesses and passages formed therein and which subsequently is filled with a material expanded therein under pressure, and wherein a portion of each passage wall is of reduced thickness relative to the remainder thereof whereby the expanded filling under pressure presses the said passage wall portion of reduced thickness into frictional engagement with the grab line for prevention of longitudinal movement of the line in the passage.

* * * * *